United States Patent
Naito

(10) Patent No.: US 7,408,985 B2
(45) Date of Patent: Aug. 5, 2008

(54) MOVING PICTURE CODING APPARATUS AND METHOD

(75) Inventor: Yukihiro Naito, Tokyo (JP)

(73) Assignee: NEC Corporation, Tokyo (JP)

( * ) Notice: Subject to any disclaimer, the term of this patent is extended or adjusted under 35 U.S.C. 154(b) by 920 days.

(21) Appl. No.: 10/228,084

(22) Filed: Aug. 27, 2002

(65) Prior Publication Data

US 2003/0043904 A1 Mar. 6, 2003

(30) Foreign Application Priority Data

Aug. 28, 2001 (JP) ............................. 2001-257888

(51) Int. Cl.
*H04N 7/12* (2006.01)
(52) U.S. Cl. ................................. 375/240.03
(58) Field of Classification Search ................ 348/391, 348/405, 419, 409, 416, 699, 700, 402, 408, 348/465, 468, 390; 375/240.03, 240.02, 375/240.27, 240.16, 240.24, 240.26, 240.23, 375/240.01, 240.05; 382/248, 250, 251, 382/232, 233, 234, 235, 259, 155, 156, 157, 382/239
See application file for complete search history.

(56) References Cited

U.S. PATENT DOCUMENTS 5,038,209 A * 8/1991 Hang .......................... 358/136
5,144,424 A 9/1992 Savatier
5,854,658 A 12/1998 Uz et al.
6,381,254 B1 * 4/2002 Mori et al. ................... 370/537
6,532,262 B1 * 3/2003 Fukuda et al. ........ 375/240.03
6,535,251 B1 * 3/2003 Ribas-Corbera ....... 375/240.03
6,937,770 B1 * 8/2005 Oguz et al. ................... 382/235
2001/0006562 A1 * 7/2001 Tajime ......................... 382/251
2002/0131494 A1 * 9/2002 Fukuda et al .......... 375/240.03
2004/0036807 A1 * 2/2004 Takahashi et al. ............ 348/700
2005/0094870 A1 * 5/2005 Furukawa et al. ............ 382/155

FOREIGN PATENT DOCUMENTS

| EP | 0 478 230 A2 | 9/1991 |
| EP | 0 545 875 A1 | 11/1992 |
| EP | 1 096 803 A2 | 10/2000 |
| JP | 63-111768 | 5/1988 |

OTHER PUBLICATIONS

English Translation of the Chinese Office Action dated Feb. 20, 2004.
United Kingdom Search Report dated Jan. 21, 2003.

* cited by examiner

*Primary Examiner*—Tung Vo
*Assistant Examiner*—Behrooz Senfi
(74) *Attorney, Agent, or Firm*—McGinn IP Law Group, PLLC

(57) ABSTRACT

A coding control section 26 determines a quantization step size 24 and frame skip control information 25 based on a remainder of a buffer 20 and a maximum quantization step size 28 output from a quantization step size change width control section 29. The quantization step size change width control section 27 receives an average quantization step size 29 calculated by the coding control section 26, and determines the maximum quantization step size 28.

12 Claims, 5 Drawing Sheets

MOVING PICTURE CODING APPARATUS AND METHOD

BACKGROUND OF THE INVENTION

The present invention relates to a moving picture coding apparatus which is utilized for a visual telephone and a television conference.

In compressive coding of a moving picture, a moving picture coding technique in which orthogonal transformation and quantization are combined with each other is widely used. FIG. 4 is a block diagram showing a coding technique such as ITU-T H.263 and ISO/IEC MPEG-4. An input picture 10 is processed at a pixel block (16×16 or 8×8, for example) unit. In a subtracter 12, a difference between the pixel block of the input picture 10 and a pixel block of a predicted picture 20 is calculated. Discrete cosine transform is applied to the said difference by a DCT (discrete cosine transformer) 13. In a quantization circuit 14, an output from the DCT circuit 13 is quantized by a quantization step size 24 determined in a coding control section 23. An output from the quantization circuit 14 is converted into a code by a variable length coding circuit 21, and is output via a buffer 22. On the other hand, an output from the quantization circuit 14 is inverse-quantized by an inverse-quantization circuit 15, and inverse-discrete cosine transform is applied thereto by an inverse-DCT circuit 16, and the predicted picture 20 is added thereto for every block in an adder 17, and it is stored in a frame memory 18. A local decoded picture block stored in the frame memory 18 and the input picture 10 are supplied to a motion vector detecting circuit 11, and a motion vector is detected. Based on the local decoded picture from the frame memory 18 and the motion vector detected by the motion vector detecting circuit 11, motion compensation is conducted by a motion compensation circuit 19, and the predicted picture 20 is output. The coding control section 23 determines the quantization step size 24 from the remainder (generated code content) of the buffer 22, and outputs it to the quantization circuit 14 and outputs frame skip control information 25, and cuts off an input of the input picture 10.

Next, a state in which the coding control section 23 determines the quantization step size 24 to be used in the quantization circuit 14 based on the remainder information of the buffer 22 will be explained by referring to FIG. 5. At a step 41, the buffer remainder is compared with a threshold value T1, and when the buffer remainder is greater than the threshold value T1, at a step 42 a constant number C1 is added to the quantization step size 24, and by making the quantization rough, the generated coding content is made less. When the buffer remainder is less than the threshold value T1, at a step 43 the buffer remainder is compared with a threshold value T2, and if the buffer remainder is greater than the threshold value 2, at a step 44 a constant number C2 is subtracted from the quantization step size 24, and by making the quantization fine, the generated coding content is made greater. Next, clip processing (steps 45-48) is conducted so that the quantization step size 24 calculated in this manner is put between preset minimum quantization step size and maximum quantization step size.

As a method of setting a minimum value and a maximum value for the quantization step size, a method shown in JP-P111768/1988A can be raised. Although the minimum value and maximum value to be set are defined as a standard of a coding method such as H.263 and MPEG4, there is a case where a value to be taken is further restricted for picture quality control. For example, by setting the maximum value of the quantization step size to be smaller, it becomes possible to suppress picture quality deterioration of each frame in a picture or the like, which moves hard. However, in this case, to suppress generated information content, it is necessary to use a frame skip or the like together for means other than a change of the quantization step size. In this case, the coding control section 23 generates frame skip control information 25 based on the remainder of the buffer 22.

However, in the above-described conventional moving picture coding apparatus, since a frame skip occurs due to the temporary increase of information content in case of compression to a low bit rate, there is a task that a frame rate becomes unstable.

SUMMARY OF THE INVENTION

The objective of the present invention is to provide a moving picture coding apparatus capable of suppressing picture quality deterioration of each frame without causing a frame skip arising from the temporary increase of information content and in a picture or the like which moves hard.

To accomplish the above-described objective, a moving picture coding apparatus of the present invention has quantization step size change width controller for receiving an average quantization step size or an average frame rate and determining a maximum quantization step size, and a coding controller for changing a quantization step size within a range specified by the maximum quantization step size and controlling generated code content.

In the present invention, by making the maximum quantization step size variable and controlling the maximum quantization step size so as to be larger in an interval where generated information content is smaller, it is possible to prevent the occurrence of a frame skip due to the temporary increase of the generated information content, and to make a frame rate stable.

Also, by controlling the maximum quantization step size so as to be smaller in an interval where the generated information content is larger, it is possible to avoid frames which have low picture quality and continue for a long time.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, embodiments of the present invention will be explained in detail by referring to drawings.

Figure 1:
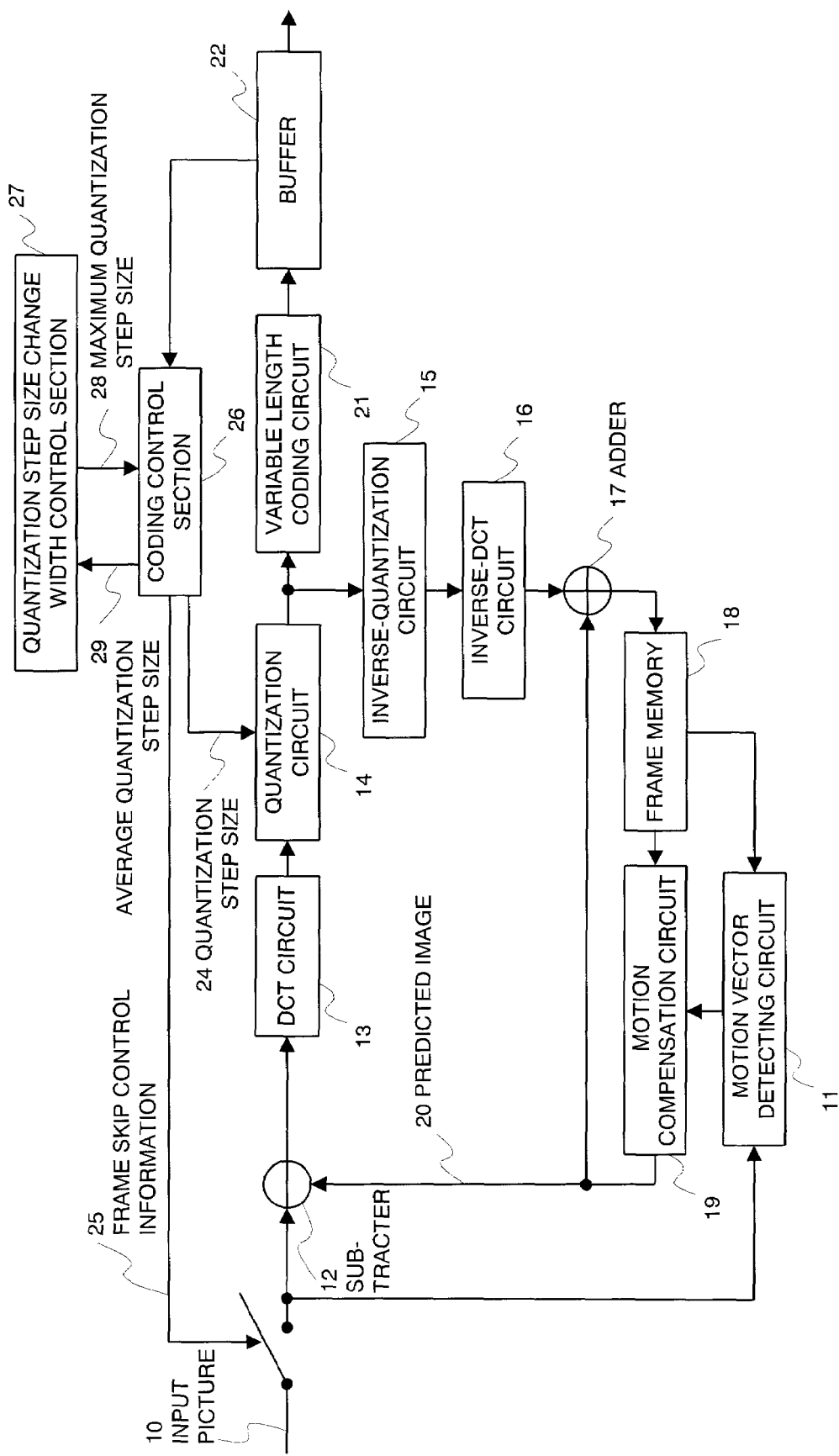
FIG. 1 is a block diagram showing a moving picture coding apparatus in a first embodiment of the present invention.
Figure 5:
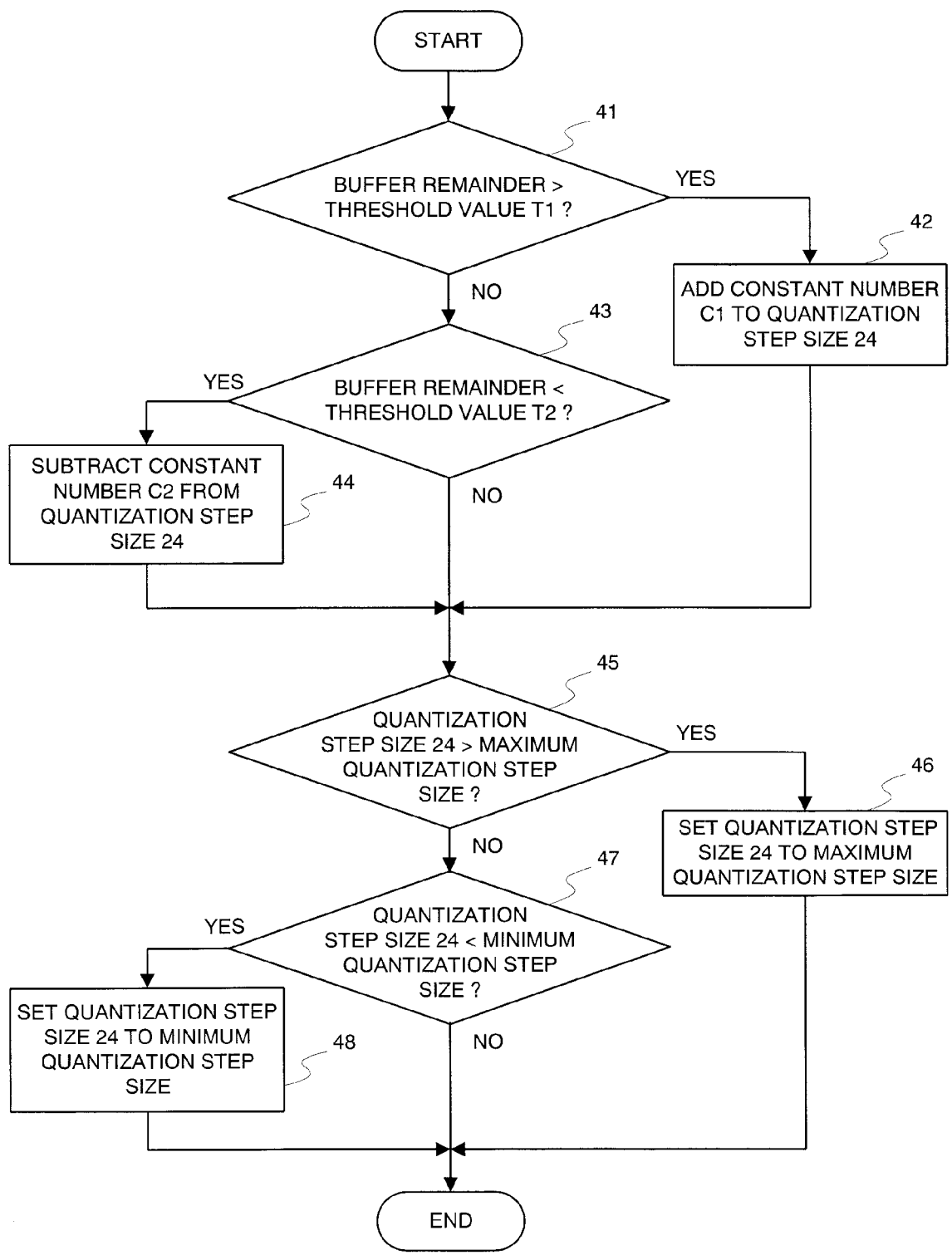

FIG. 1 is a block diagram showing a moving picture coding apparatus in a first embodiment of the present invention. Similar to the conventional apparatus of FIG. 5, a difference between an input picture 10 and a predicted picture 20 is calculated in a subtracter 12, and is coded by a variable length coding circuit 21 via a DCT circuit 13 and a quantization circuit 14, and is stored in a buffer 22.

A coding control section 26 determines a quantization step size 24, frame skip control information 25 and an average quantization step size 29 based on a remainder of the buffer 22 and a maximum quantization step size 28 output from a quantization step size change width control section 27. The quantization step size change width control section 27 receives the average quantization step size 29 determined by the coding control section 26, and determines the maximum quantization step size 28.

Figure 2:
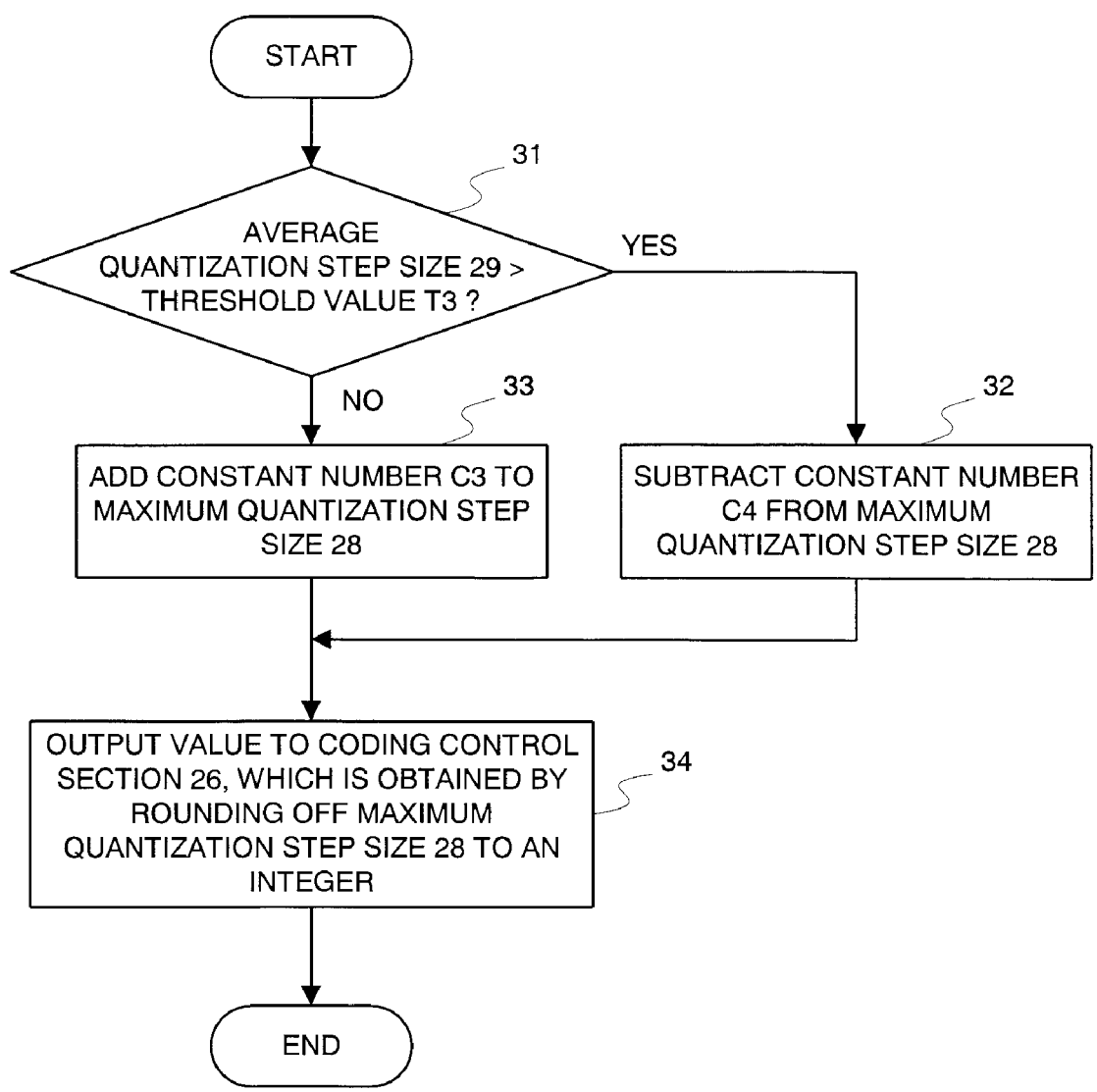
FIG. 2 is a view explaining an operation of a quantization step size change width control section 31 of FIG. 1.

Next, an operation of the quantization step size change width control section 27 will be explained by referring to FIG. 2. The quantization step size change width control section 27 receives a notice of the average quantization step size 29 from the coding control section 26, and outputs the maximum quantization step size 28 to the coding control section 26. First, at a step 31, it is determined whether the average quantization step size 29 is larger than a threshold value T3. In case that it is less than or equal to the threshold value T3, at a step 33 a constant number C3 is added to the maximum quantization step size 28, and in case that it is larger, at a step 32 a constant number C4 is subtracted. In addition, these constant number C3 and constant number C4 are constant numbers which can also take a non-integer value, and by making it be a smaller value, it is possible to suppress a sudden change of the maximum quantization step size 28. The maximum quantization step size 28 held in the quantization step size change width control section 27 is assumed to be a non-integer value, and to be a floating-point form or a fixed-point form having sufficient word length. Finally, at a step 34, a value which is obtained by rounding off the maximum quantization step size 28 calculated in this manner to an integer is output to the coding control section 26.

Figure 3:
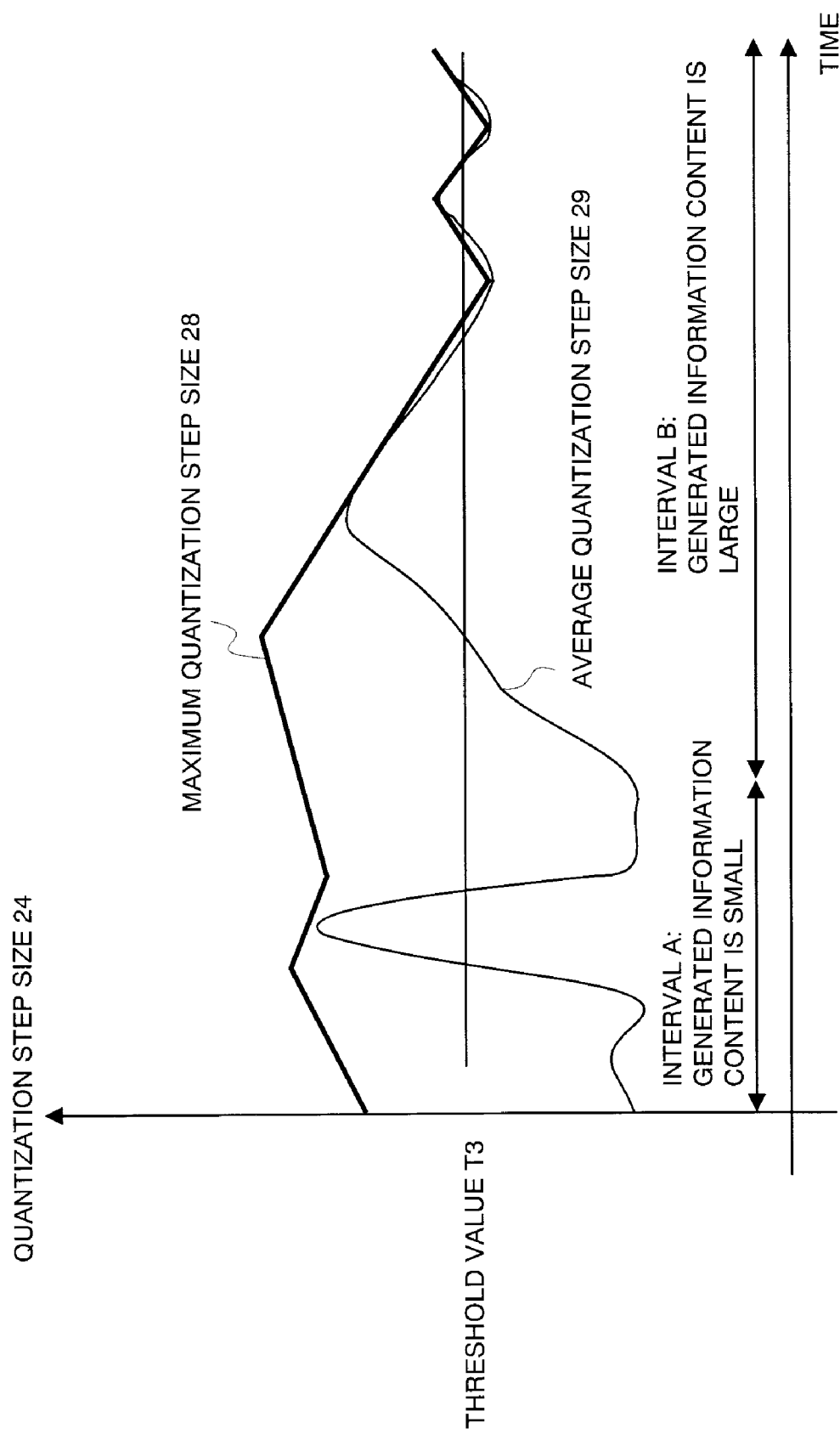
FIG. 3 is a graph explaining a relationship between generated information content and a quantization step size in the first embodiment of the present invention.
Figure 4:
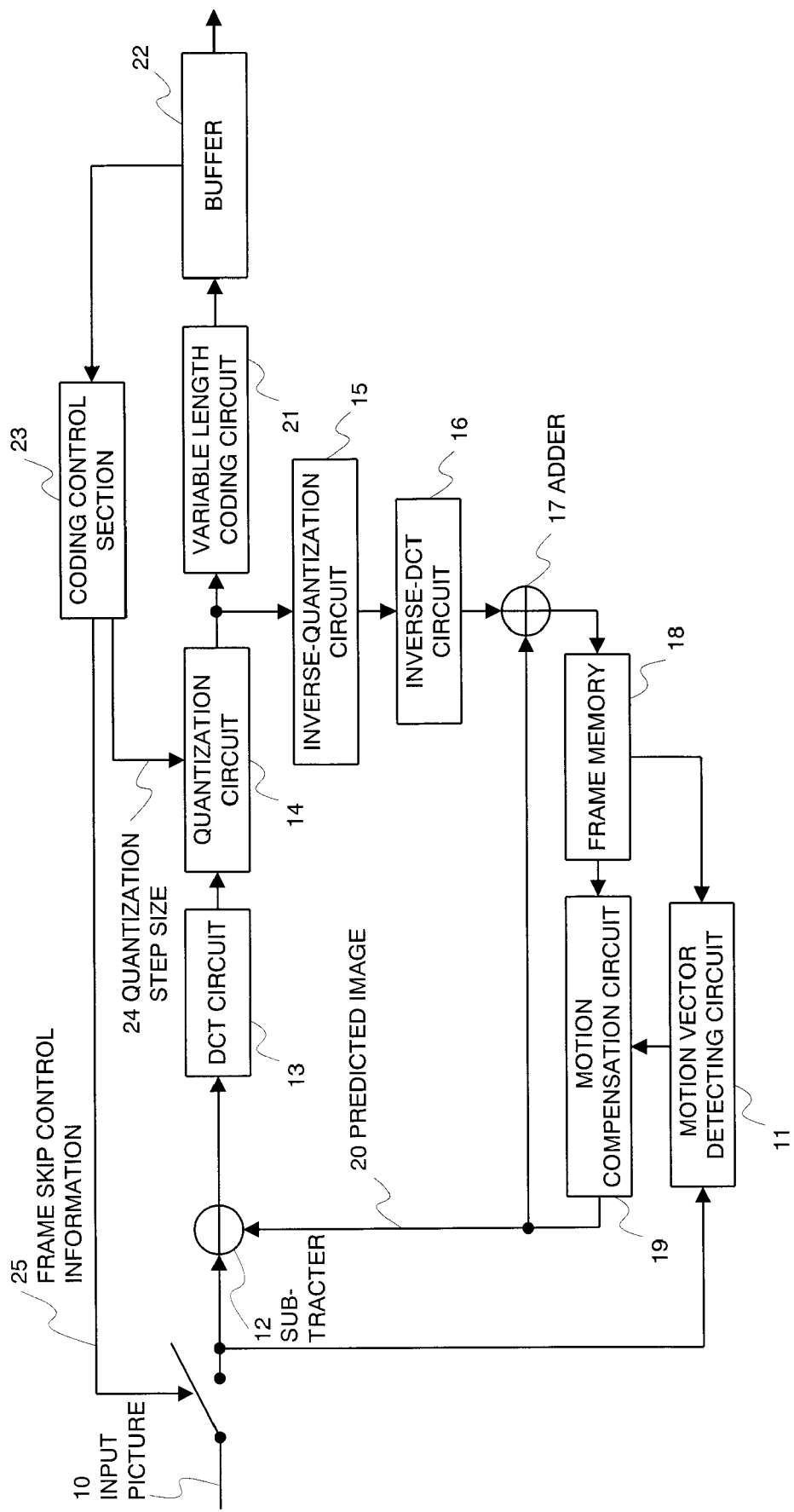
FIG. 4 is a block diagram showing a conventional moving picture coding apparatus and FIG. 5 is a view explaining an operation of a coding control section 23 of FIG. 4.

A graph explaining a relationship between generated information content and a quantization step size is shown in FIG. 3. An interval A is an interval during which complexity and movement of an picture are smaller and the generated information content is less, and an interval B is an interval during which complexity and movement of an picture are larger and the generated information content is larger.

In the interval A, since the generated information content is smaller, the average quantization step size 29 also changes a little. The maximum quantization step size 28 goes up since there are many intervals during which the average quantization step size 29 is smaller than the threshold value T3. Also in the interval A, although the generated information content becomes larger in an interval or the like during which movement of an picture becomes larger, the maximum quantization step size 28 changes largely, and does not extend to a maximum value.

In the interval B, since the generated information content is larger, the average quantization step size 29 also becomes larger. Accordingly, the maximum quantization step size 28 goes down, and in association with this, the average quantization step size 29 also goes down since its maximum value is suppressed. When the maximum quantization step size 28 becomes smaller than the threshold value T3, since the average quantization step size 29 also becomes smaller than the threshold value T3, the maximum quantization step size 28 turns to a rise. Hereafter, the maximum quantization step size 28 changes near the threshold value T3.

In this embodiment, by making the maximum quantization step size 28 variable, and making the maximum quantization step size 28 larger in an interval during which the generated information content is smaller, it is possible to prevent the occurrence of a frame skip due to the temporary increase of the generated information content, and an advantage that a frame rate is made stable can be obtained. Also, by making the maximum quantization step size smaller in an interval during which the generated information content is larger, an advantage that it is possible to avoid frames which have low picture quality and continue for a long time can be obtained.

Next, a second embodiment of the present invention will be explained.

In the second embodiment, instead of determining the maximum quantization step size 28 by using the average quantization step size 29 in the first embodiment, the maximum quantization step size 28 is determined by using an average frame rate.

In this case, the average frame rate is calculated by the coding control section 26, and is notified to the quantization step size change width control section 27. The quantization step size change width control section 27 determines whether the average frame rate is higher than a threshold value T4. In case that it is higher than the. threshold value T4, the maximum quantization step size 28 is increased, and in case that it is lower than or equal to the threshold value T4, the maximum quantization step size 28 is decreased. In this manner, since, in an interval during which the generated information content is smaller, a frame skip does not occur and a state in which a frame rate is high is maintained, the maximum quantization step size 28 also changes in its larger condition, and in an interval during which the generated information content is larger, the frame rate becomes smaller due to the occurrence of the frame skip, and the maximum quantization step size 28 also becomes smaller. As a result, an advantage same as that in the first embodiment can be obtained.

In a third embodiment of the present invention, a range which the maximum quantization step size 28 can take is set in advance in the first and second embodiments. In the calculation of the maximum quantization step size 28 in the quantization step size change width control section 27, in case that it deviates from this range, to put it within this range, clip processing is conducted. In this manner, by making the range narrower, which the maximum quantization step size 28 can take, an advantage that a change of the maximum quantization step size 28 is rapidly reflected into picture quality when a tendency of the generated information content changes can be obtained.

As explained above, according to the present invention, by making the maximum quantization step size variable, and making the maximum quantization step size larger in an interval during which the generated information content is smaller, it is possible to prevent the occurrence of the frame skip due to the temporary increase of the generated information content, and an advantage that a frame rate is made stable can be obtained, and, by making the maximum quantization step size smaller in an interval during which the generated information content is larger, an advantage that it is possible to avoid frames which have low picture quality and continue for a long time can be obtained.

What is claimed is:

1. A moving picture coding apparatus having a quantization circuit and for controlling generated code content by changing a quantization step size of said quantization circuit, comprising:

quantization step size change width controller for receiving an average quantization step size and using said average quantization step size for determining a maximum quantization step size, and coding controller for calculating said average quantization step size and outputting it, and changing a quantization step size within a range specified by said maximum quantization step size, wherein said quantization step size change width controller makes said maximum quantization step size smaller when said average quantization step size is greater than a threshold value, and otherwise, makes the maximum quantization step size larger.

2. A moving picture coding apparatus recited in claim 1, wherein said quantization step size change width controller changes said maximum quantization step size within a preset range.

3. A moving picture coding apparatus having a quantization circuit and for controlling generated code content by changing a quantization step size of said quantization circuit, comprising:

quantization step size change width controller for receiving an average frame rate and using said average frame rate for determining a maximum quantization step size, and coding controller for calculating said average frame rate and outputting it, and changing a quantization step size within a range specified by said maximum quantization step size, wherein said quantization step size change width controller makes said maximum quantization step size smaller when said average frame rate is lower than a threshold value, and otherwise, makes the maximum quantization step size larger.

4. A moving picture coding apparatus recited in claim 3, wherein said quantization step size change width controller changes said maximum quantization step size within a preset range.

5. A moving picture coding method of controlling generated code content by changing a quantization step size, comprising:

receiving an average quantization step size and using said average quantization step size for determining a maximum quantization step size, and calculating said average quantization step size and outputting it, and changing a quantization step size within a range specified by said maximum quantization step size, wherein said determining a maximum quantization step size comprises making said maximum quantization step size smaller when said average quantization step size is grater than a threshold value, and otherwise, making the maximum quantization step size larger.

6. A moving picture coding method recited in claim 5, wherein said determining a maximum quantization step size comprises changing said maximum quantization step size within a preset range.

7. A moving picture coding method of controlling generated code content by changing a quantization step size of said quantization circuit, comprising:

receiving an average frame rate and using said average frame rate for determining a maximum quantization step size; and calculating said average frame rate and outputting it, and changing a quantization step size within a range specified by said maximum quantization step size, wherein said determining a maximum quantization step size comprises making said maximum quantization step size smaller when said average quantization step size is greater than a threshold value, and otherwise, making the maximum quantization step size larger.

8. A moving picture coding method recited in claim 7, wherein said determining a maximum quantization step size comprises changing said maximum quantization step size within a preset range.

9. A moving picture coding apparatus recited in claim 2, wherein said quantization step size change width controller further executes a clip processing to keep said quantization step size within said preset range.

10. A moving picture coding apparatus recited in claim 4, wherein said quantization step size change width controller further executes a clip processing to keep said quantization step size within said preset range.

11. A moving picture coding method recited in claim 6, further comprising:

executing a clip processing to keep said quantization step size within said preset range.

12. A moving picture coding method recited in claim 8, further comprising:

executing a clip processing to keep said quantization step size within said preset range.

* * * * *